(12) United States Patent
Jungwirth et al.

(10) Patent No.: US 9,063,006 B2
(45) Date of Patent: Jun. 23, 2015

(54) OPTICAL SOURCE ASSEMBLY SUITABLE FOR USE AS A SOLAR SIMULATOR AND ASSOCIATED METHODS

(75) Inventors: Douglas R. Jungwirth, Reseda, CA (US); Lynne C. Eigler, Simi Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 1338 days.

(21) Appl. No.: 12/837,113

(22) Filed: Jul. 15, 2010

(65) Prior Publication Data

US 2010/0271799 A1  Oct. 28, 2010

Related U.S. Application Data

(63) Continuation-in-part of application No. 12/128,386, filed on May 28, 2008, now abandoned.

(60) Provisional application No. 61/051,786, filed on May 9, 2008.

(51) Int. Cl.
  *F21V 9/02*  (2006.01)
  *G01J 1/08*  (2006.01)
  *F21V 14/08*  (2006.01)
  (Continued)

(52) U.S. Cl.
  CPC . *G01J 1/08* (2013.01); *F21V 14/08* (2013.01); *F21V 9/02* (2013.01); *F21S 8/006* (2013.01); *G01J 1/04* (2013.01); *G01J 1/0422* (2013.01); *G01J 1/0488* (2013.01); *G01J 2001/0481* (2013.01); *G02B 27/0983* (2013.01); *G02B 27/0994* (2013.01)

(58) Field of Classification Search
  CPC .................................. F21V 9/02; F21V 14/08
  USPC ....................................................... 362/2, 293
  See application file for complete search history.

(56) References Cited

U.S. PATENT DOCUMENTS

| 4,125,775 A | 11/1978 | Chodak |
| 4,392,187 A * | 7/1983 | Bornhorst ..................... 362/233 |

(Continued)

FOREIGN PATENT DOCUMENTS

| FR | 2779259 A1 | 12/1999 |
| GB | 2459780 A | 11/2009 |

OTHER PUBLICATIONS

Search Report from UK Intellectual Property Office on co-pending UK application (GB0907966.6) dated Jul. 29, 2009.

(Continued)

*Primary Examiner* — Nimeshkumar Patel
*Assistant Examiner* — Christopher Raabe
(74) *Attorney, Agent, or Firm* — Yee & Associates, P.C.

(57) ABSTRACT

An apparatus may have a light source configured to generate light, a reflector configured to collect the light and direct the light in a desired direction, a spectral filter assembly configured to receive the light from the reflector. The spectral filter assembly may have a stationary frame and a plurality of filter elements supported by the stationary frame. Filter elements of the plurality of filter elements may simultaneously filter a desired quantity of light within wavelength band to provide a filtered output light beam. A homogenizer may be configured to receive the filtered output light beam and produce a homogenized light beam having a substantially uniform irradiance distribution across a cross-section of the homogenized light beam.

21 Claims, 12 Drawing Sheets

(51) Int. Cl.
  *F21S 8/00* (2006.01)
  *G01J 1/04* (2006.01)
  *G02B 27/09* (2006.01)

(56) References Cited

U.S. PATENT DOCUMENTS

| | | | |
|---|---|---|---|
| 4,423,469 A | 12/1983 | Zerlaut et al. | |
| 4,641,227 A | 2/1987 | Kusuhara | |
| 4,789,989 A | 12/1988 | Stern et al. | |
| 5,109,465 A | 4/1992 | Klopotek | |
| 5,217,285 A | 6/1993 | Sopori | |
| 5,568,366 A | 10/1996 | Jefferies | |
| 5,623,149 A | 4/1997 | Kilmer | |
| 5,984,484 A | 11/1999 | Kruer | |
| 6,097,556 A | 8/2000 | Shatz et al. | |
| 6,123,436 A | 9/2000 | Hough et al. | |
| 6,154,034 A | 11/2000 | Lovelady et al. | |
| 6,227,682 B1* | 5/2001 | Li | 362/302 |
| 6,390,650 B1 | 5/2002 | Brandt et al. | |
| 6,548,819 B1 | 4/2003 | Lovelady | |
| 6,590,149 B2 | 7/2003 | Adelhelm | |
| 6,830,339 B2 | 12/2004 | Maximus | |
| 7,066,608 B2 | 6/2006 | Davis et al. | |
| 7,067,831 B2 | 6/2006 | Ahrens et al. | |
| 7,128,441 B2 | 10/2006 | Monch | |
| 7,178,948 B2 | 2/2007 | Gupta | |
| 7,306,342 B2 | 12/2007 | Wu et al. | |
| 2004/0207821 A1* | 10/2004 | Roddy et al. | 353/94 |
| 2004/0246389 A1* | 12/2004 | Roth | 349/5 |
| 2004/0246449 A1 | 12/2004 | Niwa | |
| 2005/0237764 A1* | 10/2005 | Jain | 362/551 |
| 2006/0238750 A1 | 10/2006 | Shimotomai | |
| 2007/0097691 A1 | 5/2007 | Wu | |
| 2007/0206901 A1 | 9/2007 | Bonitatibus et al. | |
| 2007/0267056 A1 | 11/2007 | Hishikawa | |
| 2007/0279534 A1 | 12/2007 | Doser | |

OTHER PUBLICATIONS

USPTO Office Action dated Aug. 27, 2009 regarding U.S. Appl. No. 12/128,386, 14 pages.
Response to Office Action dated Oct. 9, 2009 regarding U.S. Appl. No. 12/128,386, 18 pages.
USPTO Final Office Action dated Feb. 17, 2010 regarding U.S. Appl. No. 12/128,386, 16 pages.
UK Search Report dated Oct. 31, 2011 regarding application No. GB1111018.6, applicant reference P52165GB/RGBH, applicant The Boeing Company, 5 Pages.

* cited by examiner

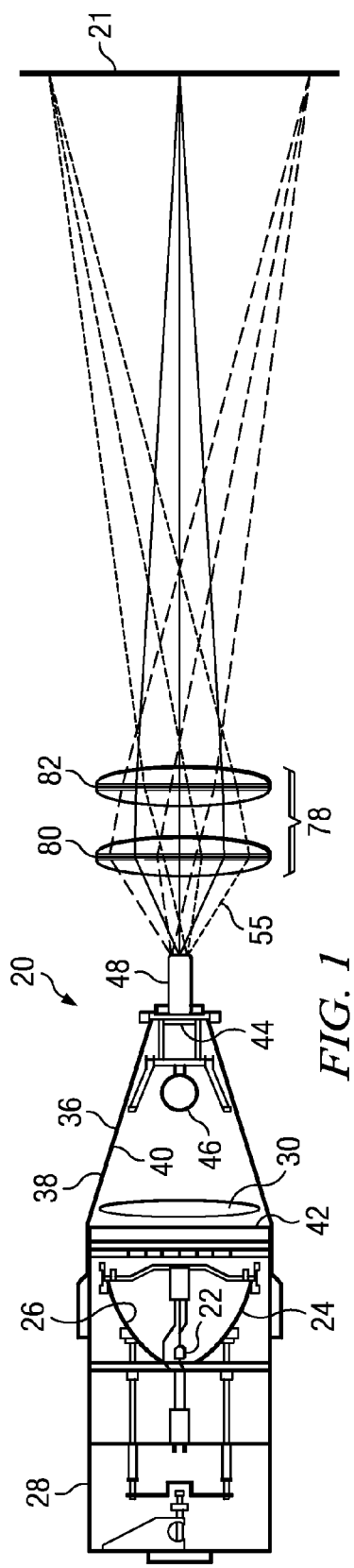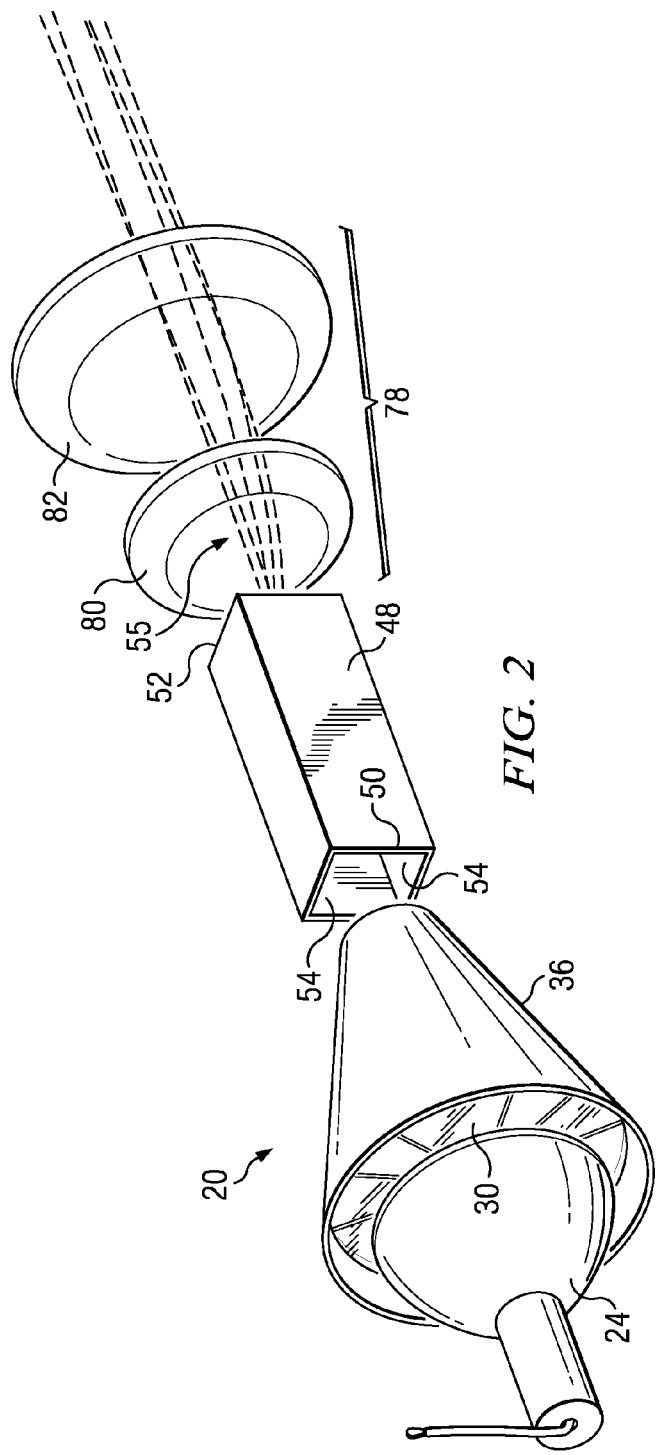
FIG. 1
FIG. 2

OPTICAL SOURCE ASSEMBLY SUITABLE FOR USE AS A SOLAR SIMULATOR AND ASSOCIATED METHODS

RELATED APPLICATION

This application is a continuation-in-part of patent application U.S. Ser. No. 12/128,386, filed May 28, 2008, entitled "Optical Source Assembly Suitable For Use as a Solar Simulator and Associated Methods", which, in turn, claims priority to provisional application Ser. No. 61/051,786, filed on May 9, 2008, the entire contents of which are hereby incorporated by reference.

BACKGROUND INFORMATION

1. Field

The present disclosure relates to testing of solar cells and other optical sensors.

2. Background

Many optical sensors, particularly solar cells, need to be tested at various stages in the production cycle to assure performance and reliability. With solar cells made using older technologies, it was sufficient to test the cells with a properly shaped, spatially uniform beam on the solar cells. For example, it was not of great importance to ensure that factors such as spectral content and range of incident angles of the light closely mimicked those of the Sun. With the advent of advanced designs for multi-junction solar cells, such as those having four, five and six or more junctions, the need for an optical source assembly/solar simulator that can take artificial light and create a beam that closely mimics sunlight in terms of spatial uniformity, angular range, and spectral profile has increased. To properly test six junction solar cells, for example, it is desirable to adjust the spectral content in each of the six individual bands that are used in the solar cell structure. Present solar simulators typically have only one or two adjustable bands. These bands are usually adjusted with static notch filters. With the introduction of six junction solar cells, this old technology is no longer suitable.

SUMMARY

Embodiments of the present optical source assembly/solar simulator and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include the ability to produce a spatially well balanced output beam, the ability to easily adjust the spectral characteristics of the output beam, the ability to image the output beam to a point in space where the test sensor/solar cell is located, and the ability to control the range of angles of incidence on the test sensor/solar cell.

One illustrative embodiment comprises an apparatus. The apparatus may have a light source configured to generate light, a reflector configured to collect the light and direct the light in a desired direction, and a spectral filter assembly configured to receive the light from the reflector. The spectral filter assembly may have a stationary frame, and a plurality of filter elements supported by the stationary frame, filter elements of the plurality of filter elements simultaneously filtering a desired quantity of light within a wavelength band to provide a filtered output light beam. The apparatus may also have a homogenizer configured to receive the filtered output light beam and produce a homogenized light beam, the homogenized light beam having a substantially uniform irradiance distribution across a cross-section of the homogenized light beam.

Another illustrative embodiment comprises a method. The method may include generating light, collecting the light and directing the light in a desired direction, and simultaneously filtering the light by a plurality of filter elements to provide a filtered output light beam, wherein each filter element of the plurality of filter elements blocks a desired quantity of light within a wavelength band. The method may also include homogenizing the filtered output light beam to produce a homogenized light beam having a substantially uniform irradiance distribution across a cross-section of the homogenized light beam.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a side elevation view of an optical source assembly/solar simulator and imaging lens assembly according to an illustrative embodiment;

FIG. 2 is a rear perspective view of the optical source assembly/solar simulator and imaging lens assembly of FIG. 1;

DETAILED DESCRIPTION

Figure 3:
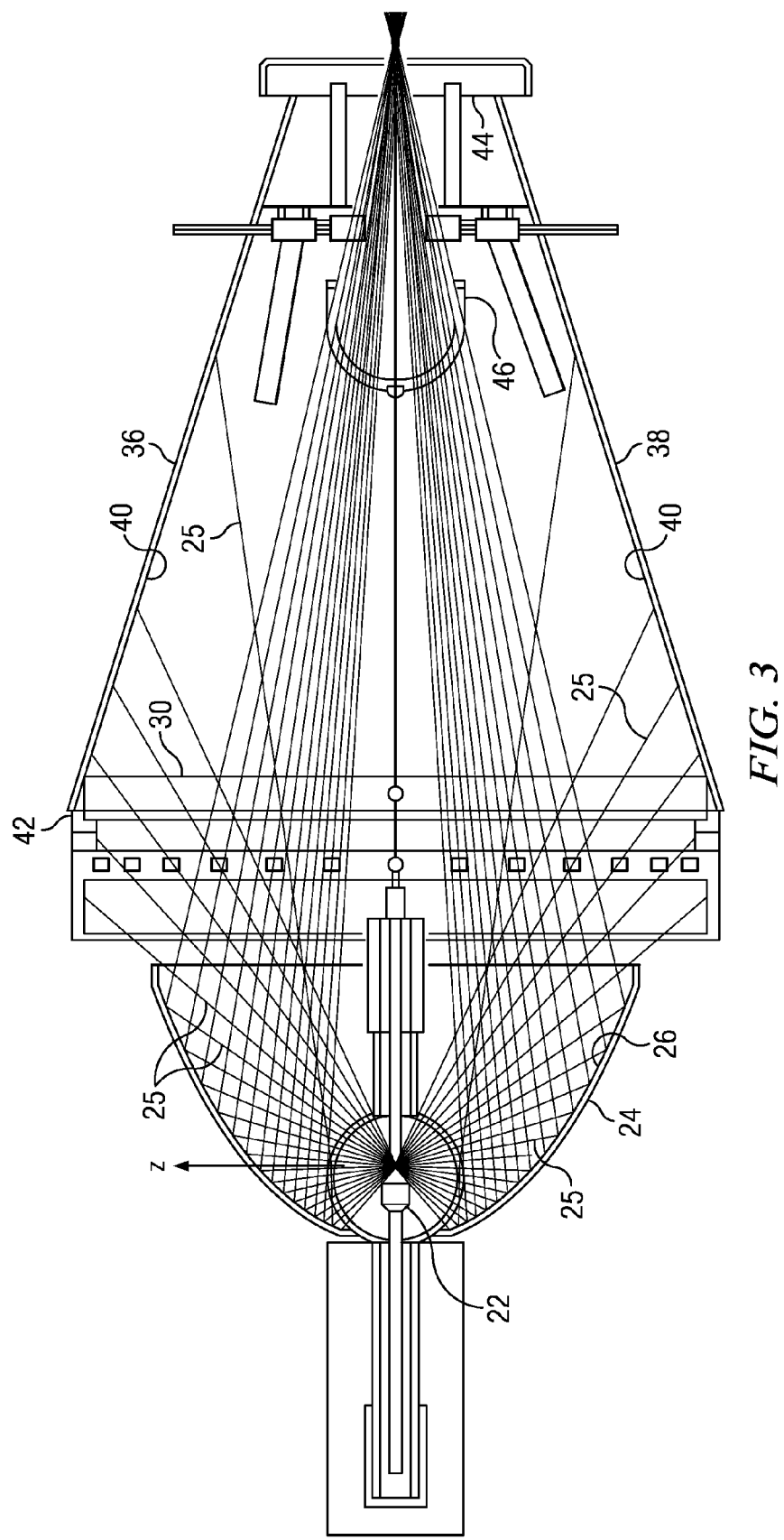
FIG. 3 is a side cross-sectional view of a subassembly of the optical source assembly/solar simulator of FIG. 1.

In the detailed description that follows, the present embodiments are described with reference to the drawings. In the drawings, elements of the present embodiments are labeled with reference numbers. These reference numbers are reproduced below in connection with the discussion of the corresponding drawing features.

FIGS. 1 and 2 illustrate an optical source assembly/solar simulator and imaging lens assembly according to an illustrative embodiment. In particular, FIG. 1 is a side elevation view of an optical source assembly/solar simulator and imaging lens assembly according to an illustrative embodiment, and FIG. 2 is a rear perspective view of the optical source assembly/solar simulator and imaging lens assembly of FIG. 1. The optical source assembly/solar simulator is generally designated by reference number 20, and may be used for testing optical sensors, including solar cells 21. Many components shown in the accompanying figures are illustrated schematically, and the drawings are not to scale. Accordingly, the drawings should not be interpreted as limiting.

The illustrated optical source assembly/solar simulator 20 includes a light source 22 and a reflector 24. In one embodiment the light source 22 is a high pressure xenon (Xe) lamp, but those of ordinary skill in the art will appreciate that other light sources could be used. The reflector 24 includes a reflective internal surface 26 that collects the light emanating from the source 22 and directs the light in a desired direction, as illustrated in FIG. 3, which is a side cross-sectional view of the reflector 24. The reflector 24 receives light rays 25 emanating from the light source 22. Because the internal surface 26 of the reflector 24 is reflective, the angle of reflection for each light ray is equal to its angle of incidence. The curved cross-sectional shape of the reflector 24 thus directs the light rays in the desired direction. In the illustrated embodiment, the reflector 24 has an elliptical shape when viewed in side cross-section. However, those of ordinary skill in the art will appreciate that the reflector 24 could have other shapes.

With reference to FIG. 1, the optical source assembly/solar simulator 20 may include a housing 28 for locating the optical source assembly/solar simulator components and for providing structural support and protection to components in the housing 28. Although not pictured, the optical source assembly/solar simulator 20 may also include a power supply for powering the lamp 22 and other components of optical source assembly/solar simulator 20.

Light from the lamp 22 and the reflector 24 passes through a spectral filter assembly 30 that may block at least some of the light at certain wavelengths. In addition, the spectral filter assembly 30 is adjustable, so that various amounts of light at various wavelengths can be selectively passed through the spectral filter assembly 30 and selectively blocked by the spectral filter assembly 30. For example, and as will be more fully described hereinafter, in a given application it may be desirable to block 10% of the red light, 15% of the green light, and 5% of the ultraviolet light. For this application the spectral filter assembly 30 would be adjusted to block those proportions of the light received from the lamp 22 and reflector 24. Since the spectrum of sunlight that reaches the earth's surface is influenced by the location on earth where the sunlight strikes, the spectrum that one might want to simulate is dependent upon the geographic location one wants to simulate. Thus the capability to adjust the spectrum of light generated by the optical source assembly/solar simulator 20 enables optical sensors and solar cells to be tested according to the location on Earth where they ultimately will be deployed. For example, the presence of certain pollutants in a given location may block a portion of the Sun's spectrum. In another location where those same pollutants are not present, the same spectral blocking would not occur.

FIGS. 4-7 illustrate further details of the spectral filter assembly 30. In the illustrated embodiment, the spectral filter assembly 30 has a flat, pie-shaped configuration with a plurality of wedge-shaped filter elements 32. The embodiment shown includes twelve filter elements 32. However, those of ordinary skill in the art will appreciate that spectral filter assembly 30 could include any number of filter elements 32, including just one. Further, those of ordinary skill in the art will appreciate that more than one filter assembly may be used in optical source assembly/solar simulator 20. For example, more than one spectral filter assembly might be needed if it is desired to block more of a given waveband than is possible with a single filter assembly, or if it is desired to block a waveband that covers part of two of the wavebands in the first filter assembly. The filter elements 32 may be constructed of any transparent or translucent material, such as glass or plastic. The filter elements 32 may further be any color, including colorless. Further, the filter elements 32 may be either reflective or absorptive filters.

Figure 5:
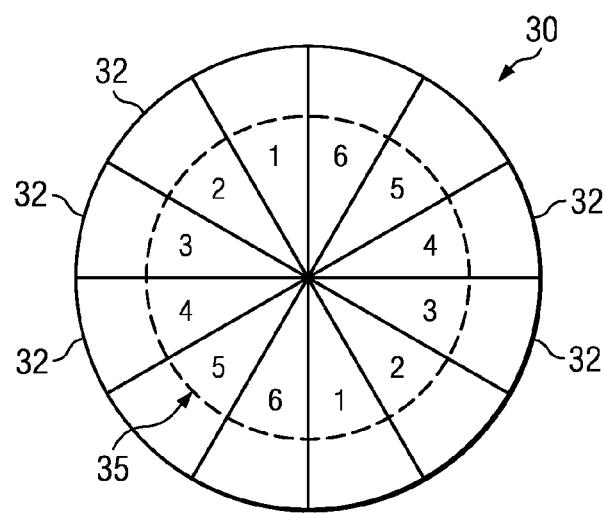
FIG. 5 is a schematic diagram of a spectral filter assembly in the optical source assembly/solar simulator of FIG. 1 with filter elements thereof in a fully inserted position.

With reference to FIG. 5, in certain embodiments the filter elements 32 are organized into matched pairs. The matched pairs are indicated by the matching numbers on the filter elements 32 in FIG. 5. The members of each matched pair may be diametrically opposed within the spectral filter assembly 30. The spectral filter assembly 30 thus produces a symmetrical and balanced output beam. The spectral content of the light within one portion of the beam's cross-section is closely matched with the spectral content of the light within the diametrically opposed portion of the beam's cross-section.

Figure 4:
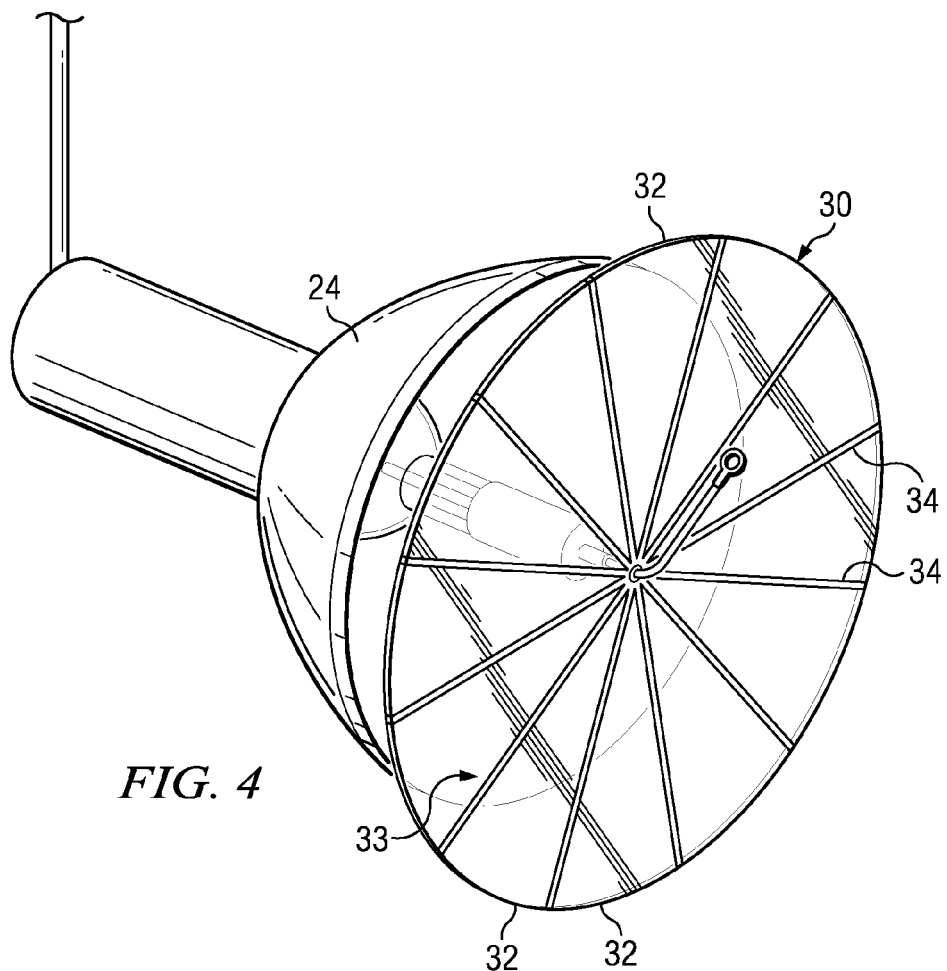
FIG. 4 is a front perspective view of a subassembly of the optical source assembly/solar simulator of FIG. 1.

Filter assembly 30 is preferably mounted to be stationary within housing 28 of optical source assembly/solar simulator 20; however, filter elements 32 are preferably mounted in filter assembly 30 so as to be independently moveable, for example, by being individually slid into and out of the path of the light from the lamp 22 and the reflector 24. For example, as shown in FIG. 4, the filter elements 32 may be contained within a frame 33 that defines a plurality of wedge-shaped apertures 34 in the spectral filter assembly 30. The filter elements 32 may be mechanically supported in frame 33 so as to be movable between fully inserted and fully retracted positions within filter assembly 30 while maintaining orthogonality to the optical axis the optical source assembly/solar simulator 20. The filter elements 32 may be configured so that each matched pair blocks a desired quantity of light within a given wavelength band. The light passing through the spectral filter assembly 30 is thus broken into a plurality of differently colored beams. Further, the filtering characteristics of the spectral filter assembly 30 can be tuned by partially or fully retracting one or more filter element 32, and/or one or more matched pair of filter elements 32.

Figure 6:
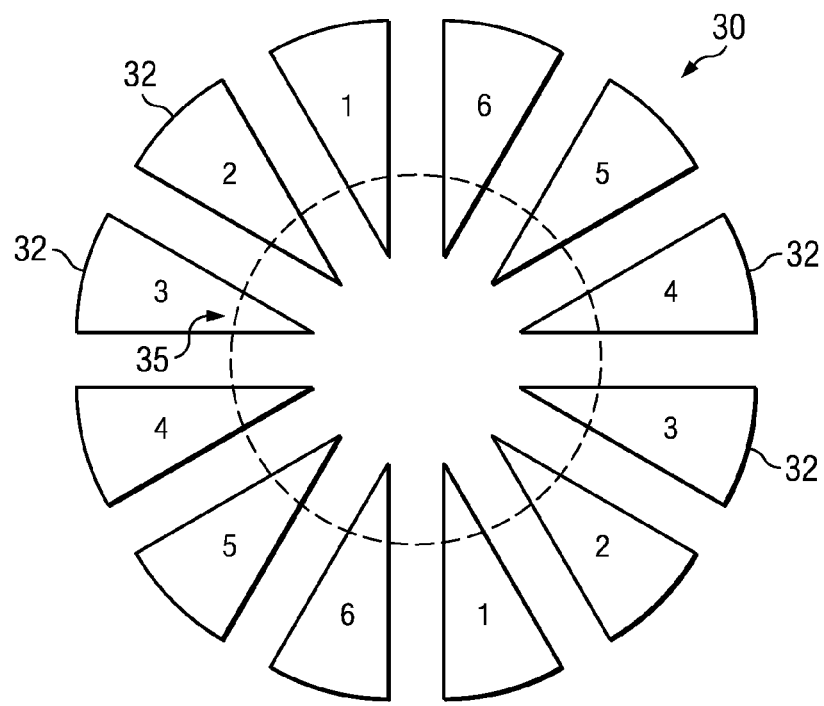
FIG. 6 is a schematic diagram that illustrates the spectral filter assembly of FIG. 5 with filter elements thereof in a fully retracted position.
Figure 7:
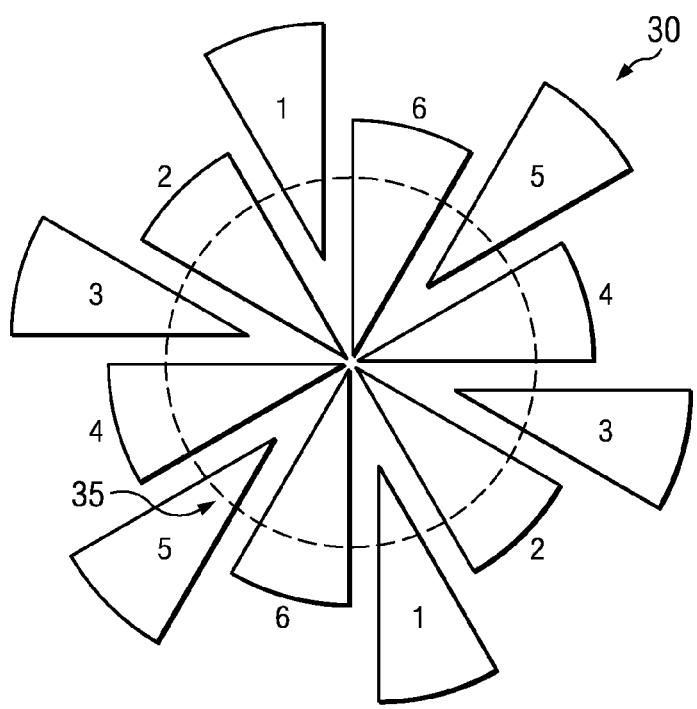
FIG. 7 is a schematic diagram that illustrates the spectral filter assembly of FIG. 5 with some filter elements thereof in a fully inserted position and some filter elements thereof in a fully retracted position.

FIGS. 5-7 are schematic diagrams that illustrate the spectral filter assembly of FIG. 4 with filter elements thereof in different positions within filter assembly 30. In particular, FIG. 5 is a schematic diagram that illustrates the spectral filter assembly of FIG. 4 with filter elements thereof in a fully inserted position. FIG. 6 is a schematic diagram that illustrates the spectral filter assembly of FIG. 4 with filter elements thereof in a fully retracted position, and FIG. 7 is a schematic diagram that illustrates the spectral filter assembly of FIG. 4 with some filter elements thereof in a fully inserted position and some filter elements thereof in a fully retracted position.

As shown in FIG. 5, when all of the filter elements 32 are in a fully inserted position in filter assembly 30, all of the filter elements are in the path of light beam 35 from lamp 22 and reflector 24 and simultaneously filter the light beam in accordance with the properties of the filter elements. On the other hand, as shown in FIG. 6, when all of the filter elements 32 are in a fully retracted position, all of the filter elements are substantially fully outside the beam path 35 and do not filter the light beam. Yet further, FIG. 7 illustrates even numbered filter elements fully inserted into the spectral filter assembly, and thus fully in the light beam path 35 to simultaneously filter the light, while the odd numbered filter elements are in fully retracted positions substantially fully outside the light beam path 35. It should be understood that FIG. 7 is intended to be exemplary only as one or more filter elements or any one or more pairs of filter elements may be positioned to be fully in, fully out or partially within the light beam path 35 to provide the desired light properties.

By mounting spectral filter assembly 30 to be stationary within optical source assembly/solar simulator 20, all color bands of interest may be controlled simultaneously. In a system such as described herein, wherein a detector having electronic sensors are used, it is desirable to have all the appropriate wavelengths of light strike the detector at all times and in the appropriate amounts, and using the plurality of filter elements 32 simultaneously achieves this objective. In general, illustrative embodiments provide the simultaneous use of multiple filters in conjunction with the ability to change the amount of filtration for each given waveband in order to achieve the desired spectral response from the optical source assembly/solar simulator 20.

Figure 8:
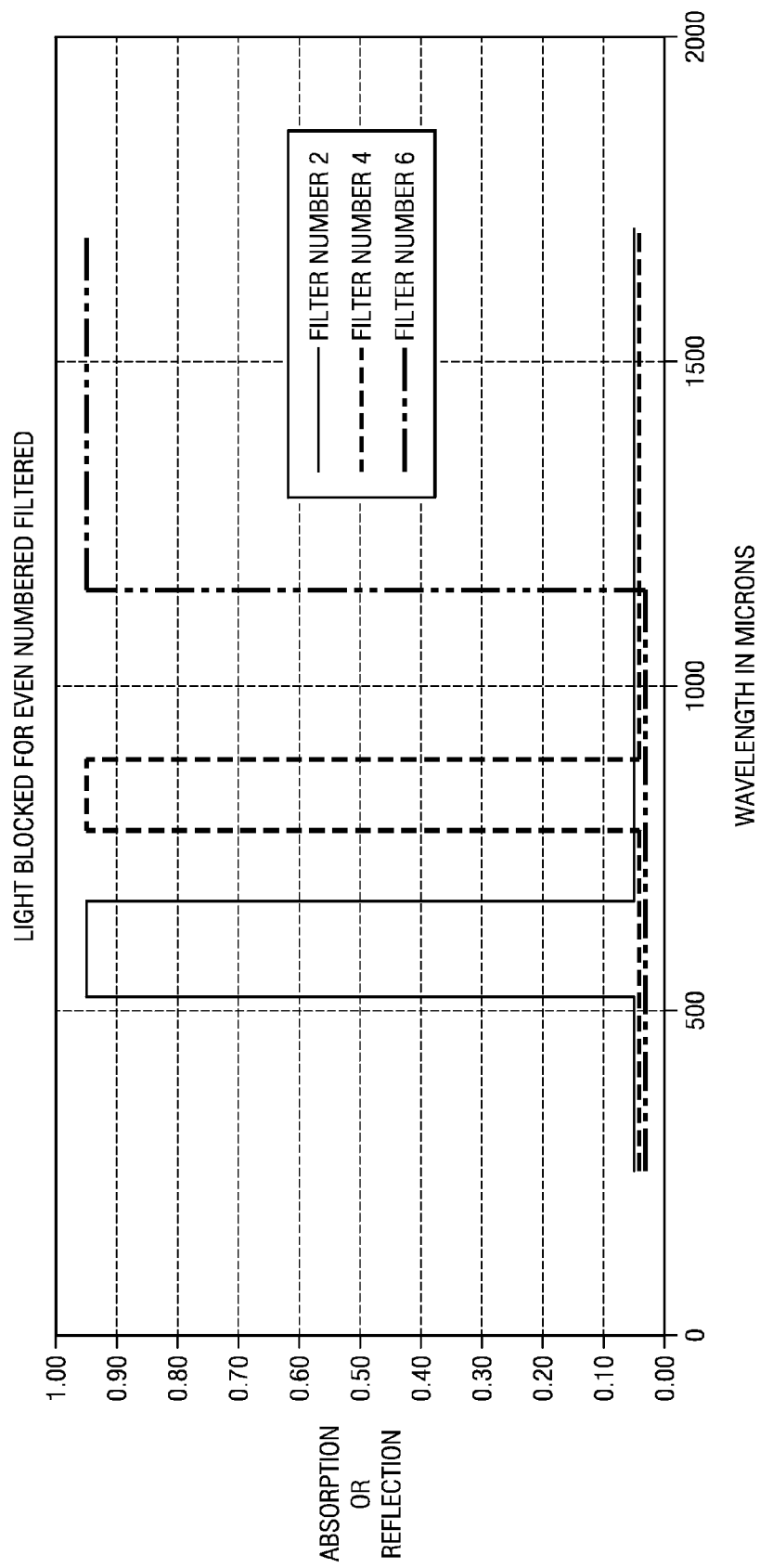
FIG. 8 is a graph that illustrates response curves using the spectral filter assembly of FIGS. 5-7 with even numbered filter elements in fully inserted positions and odd numbered filter elements in fully retracted positions in accordance with an illustrative embodiment.
Figure 9:
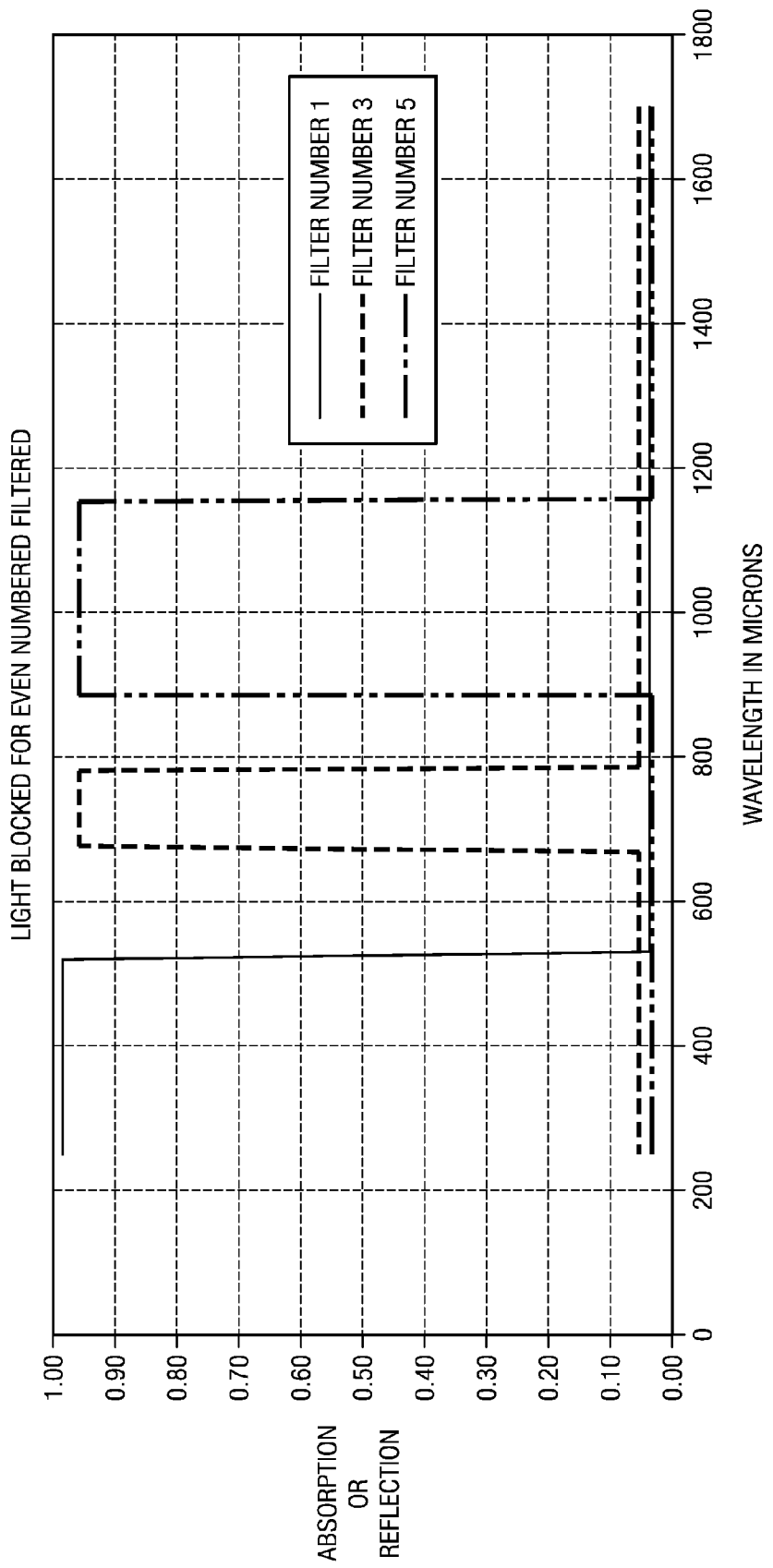
FIG. 9 is a graph that illustrates response curves using the spectral filter assembly of FIGS. 5-7 with odd numbered filter elements in fully inserted positions and even numbered filter elements in fully retracted positions in accordance with an illustrative embodiment.

FIGS. 8 and 9 are graphs that illustrate response curves using the spectral filter assembly of FIGS. 5-7 in accordance with illustrative embodiments. In the illustrated embodiments, the filters are reflective or absorptive so that when inserted they block the waveband of interest as shown in FIGS. 8 and 9. In particular, FIG. 8 is a graph that illustrates response curves with even numbered filter elements in a fully inserted position and odd numbered filter elements in a fully retracted position in accordance with an illustrative embodiment; and FIG. 9 is a graph that illustrates response curves using the spectral filter assembly of FIGS. 5-7 with odd numbered filter elements in a fully inserted position and even numbered filter elements in a fully retracted position in accordance with an illustrative embodiment.

Filter elements 32 and/or matched pairs of filter elements 32 may also be removed entirely and replaced with filter elements 32 having different properties. When it is desired to block a greater percentage of red light, for example, one or more of the red-blocking matched pairs may be removed and replaced with a matched pair that blocks red light. The spectral filter assembly 30 may also be configured to block light outside the visible spectrum, such as in the infrared and ultraviolet bands.

In one embodiment, the wavelength bands blocked by the matched pairs of filter elements 32 may cover the entire spectrum with little or no overlap between neighboring bands. Thus, a first matched pair of filter elements 32 may block light in the ultraviolet spectrum, a second matched pair may block light between 380 nm and 476 nm, a third matched pair may block light between 476 nm and 572 nm, etc. In other embodiments, the blocked wavelength bands may be such that some or all bands overlap with neighboring bands. Thus, a first matched pair of filter elements 32 may block light between 380 nm and 490 nm, and a second matched pair of filter elements 32 may block light between 470 nm and 590 nm. In still other embodiments, the blocked wavelength bands may be such that there are gaps between neighboring bands.

Note that it is also possible for the filters to be designed such that each one passes the waveband of interest and blocks all the other wavebands. In this case, the vertical axes of FIGS. 8 and 9 would be relabeled throughput. This might be called an inverse filter. As an example of how an inverse filter set might work, let it be assumed that inverse filters are being used. When the number 3 filter set is fully inserted the light transmitted though these filters are only the light falling in the waveband of the number 3 filter set. Let it further be assumed that there is too much light in waveband 3 for the desired system spectral response. As filter set 3 begins to be retracted, more of the other colors and the same amount of waveband 3 light are obtained, so the relative amount of light in waveband 3 decreases. Other filter configurations are also possible.

Although not pictured, the present source assembly/solar simulator 20 may further include a coarse filter located upstream from the spectral filter assembly 30. The coarse filter produces an output beam having a spectrum that is close to the desired spectrum. The adjustable spectral filter assembly 30 then fine tunes that beam to achieve the desired spectrum.

Although also not pictured, the present source assembly/solar simulator 20 may further include one or more blocking apertures. The blocking apertures may be positioned downstream from the spectral filter assembly 30. The blocking apertures may, for example, comprise a disk with one or more wedge-shaped opaque apertures. In one embodiment the blocking apertures may comprise a diametrically opposed pair of opaque apertures. By rotating the disk, the pair of opaque apertures may be positioned in front of a desired matched pair of filter elements 32 to starve the output from the simulator 20 of light in desired wavelengths With reference to FIGS. 1-3, the light exiting the spectral filter assembly 30, the filtered light, passes through a cone assembly 36. In the illustrated embodiment, the cone assembly 36 comprises a substantially cone-shaped member 38 having absorptive interior surfaces 40 (FIG. 3). The cone-shaped member 38 tapers downward from a larger aperture 42 proximate the spectral filter assembly 30 to a smaller aperture 44 spaced from the spectral filter assembly 30. The tapered absorptive surfaces 40 within the cone-shaped member 38 capture and contain light rays 25 not traveling in the desired direction. Thus, when the filtered light exits the cone assembly 36 the range of angles within the filtered light is less than when the filtered light entered the cone assembly 36. For example, the range of angles of the light that exits the light source 22 and filter assembly 30 and that does not strike the reflector may range from zero to approximately ninety degrees, while the filtered light exiting the cone assembly 36 may range from zero to approximately fifteen degrees. Those of ordinary skill in the art will appreciate that these ranges are only examples, and not limiting. Since the light exiting the light source 22 may contain both UV and near infrared (NIR) radiation, capturing the "stray" light enhances the safety characteristics of the source assembly/solar simulator 20.

Although not pictured, the cone assembly 36 may include cooling apparatus if the light source 22 is of sufficient wattage to cause the cone assembly 36 to get hot during use. With reference to FIGS. 1 and 3, a distal end of the cone assembly 36 may include a shutter 46 to enable easy blocking of the light from the source assembly/solar simulator 20. The shutter 46 acts as an ON/OFF switch for the simulator 20, even when the light source 22 remains illuminated.

With reference to FIGS. 1 and 2, after exiting the cone assembly 36, the filtered light enters a homogenizer 48. With reference to FIG. 2, the homogenizer 48 is shaped as an elongate box having a square cross-section. Those of ordinary skill in the art will appreciate that the homogenizer 48 could have a variety of cross-sectional shapes. In some embodiments, the cross-sectional shape of the homogenizer 48 may be chosen to match the shape of the optical sensor or solar cell 21 being tested. Thus, the cross-sectional shape may be rectangular, hexagonal, etc. In the illustrated embodiment, the homogenizer 48 has a constant cross-sectional area from a first end 50 proximate the cone assembly 36 to a second end 52 spaced from the cone assembly 36. In alternative embodiments, however, the homogenizer 48 may taper outward from the first end 50 to the second end 52. In still further alternative embodiments the homogenizer 48 may taper inward from the first end 50 to the second end 52. The tapering may occur with respect to only an interior width of the homogenizer 48, or with respect to both an interior width and an exterior width.

With continued reference to FIG. 2, the homogenizer 48 includes polished, smooth, flat and reflective inner surfaces 54. These surfaces 54 reflect, rather than scatter light. Light entering the homogenizer 48 undergoes multiple reflections as it propagates from the input end 50 to the output end 52. As the light input to the homogenizer 48 propagates through the homogenizer 48, the light mixes to produce a homogenized output beam 55. In one embodiment, the homogenized output beam 55 has substantially uniform distributions of irradiance and spectrum across the beam's cross-section. By using appropriate filter settings, the substantially uniform distributions mimic the corresponding distributions present in sunlight striking Earth's surface. Those of ordinary skill in the art will appreciate that other distributions may also be achieved by proper selection of the homogenizer shape and size.

Figure 10:
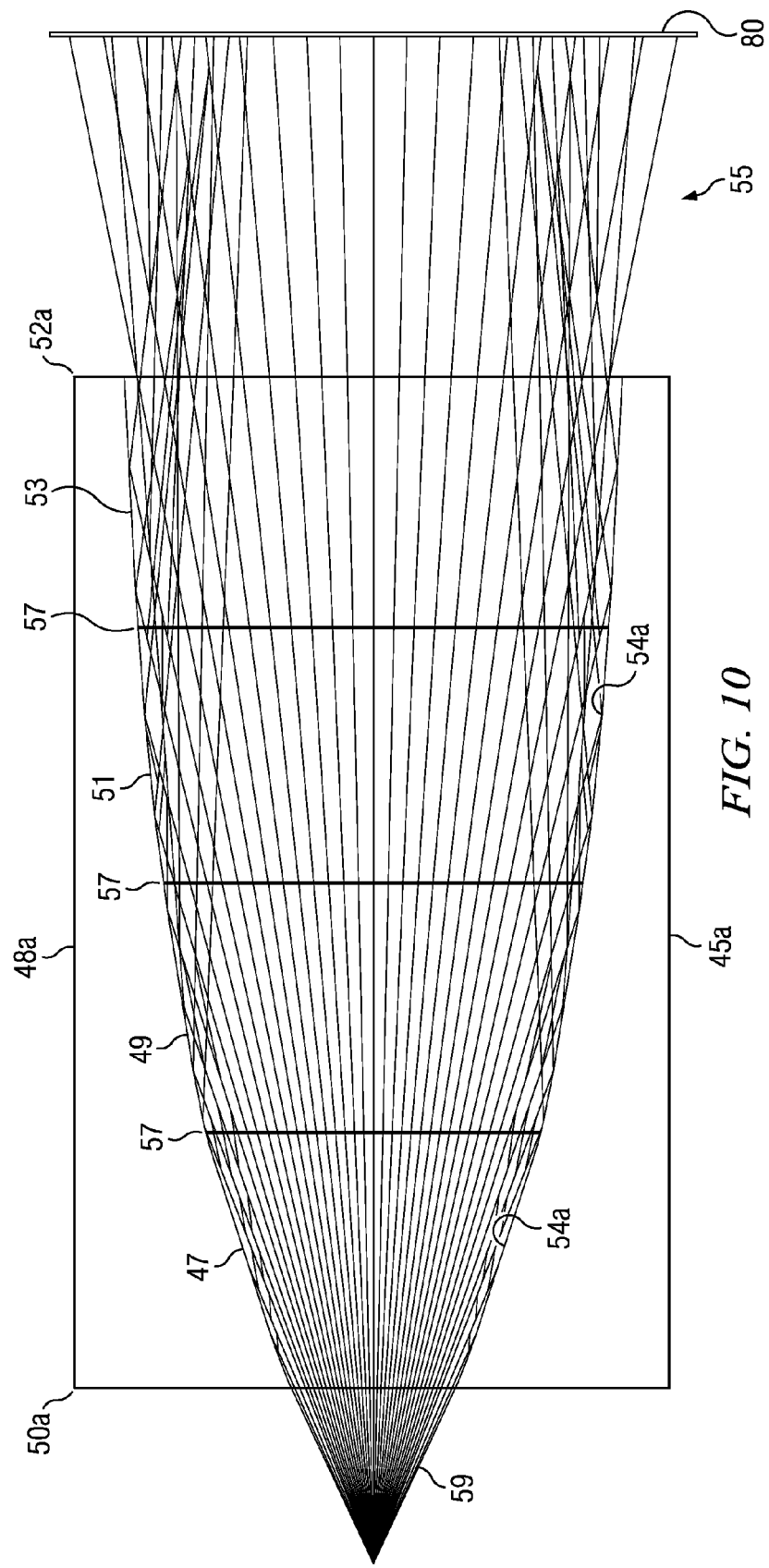
FIG. 10 is a schematic side cross-sectional view of one embodiment of a homogenizer for use in the optical source assembly/solar simulator of FIG. 1.

FIG. 10 illustrates an alternative embodiment of the homogenizer 48a. FIG. 10 is a schematic side cross-sectional view of the homogenizer 48a, illustrating its exterior surfaces 45a and reflective interior surfaces 54a. The homogenizer 48a includes an interior taper, while the exterior surfaces 45a are not tapered. The interior surfaces 54a taper outwardly from the first end 50a to the second end 52a. Further, the taper occurs in graduated steps 47, 49, 51 and 53, which are separated by transition boundaries 57. In the illustrated embodiment, four steps 47, 49, 51 and 53 are shown, but those of ordinary skill in the art will appreciate that any number of steps may be used. In the homogenizer 48a of FIG. 10, the taper angle decreases from the first graduated step 47 to the last graduated step 53. The resultant beam 55 exiting the homogenizer 48a has a smaller range of angles than the input beam 59 to the homogenizer 48a. Those of ordinary skill in the art will appreciate that various embodiments of the present homogenizer may include a variety of tapers, including graduated, smooth, increasing, decreasing, etc. The illustrated embodiments should not be interpreted as limiting.

Figure 11:
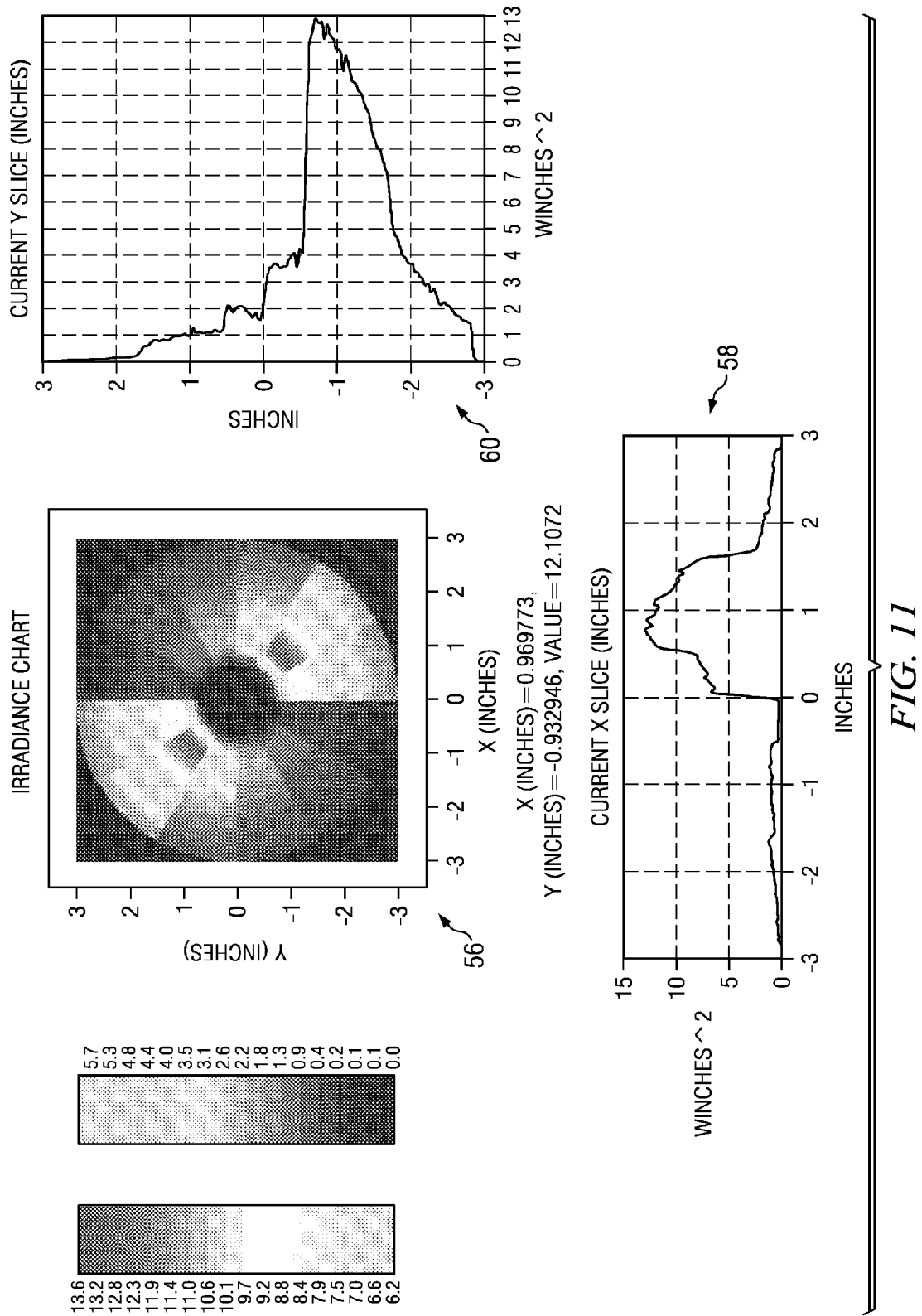
FIG. 11 is a chart illustrating analytical results of a spectral distribution for light within the optical source assembly/solar simulator of FIG. 1 before the light passes through the homogenizer.
Figure 12:
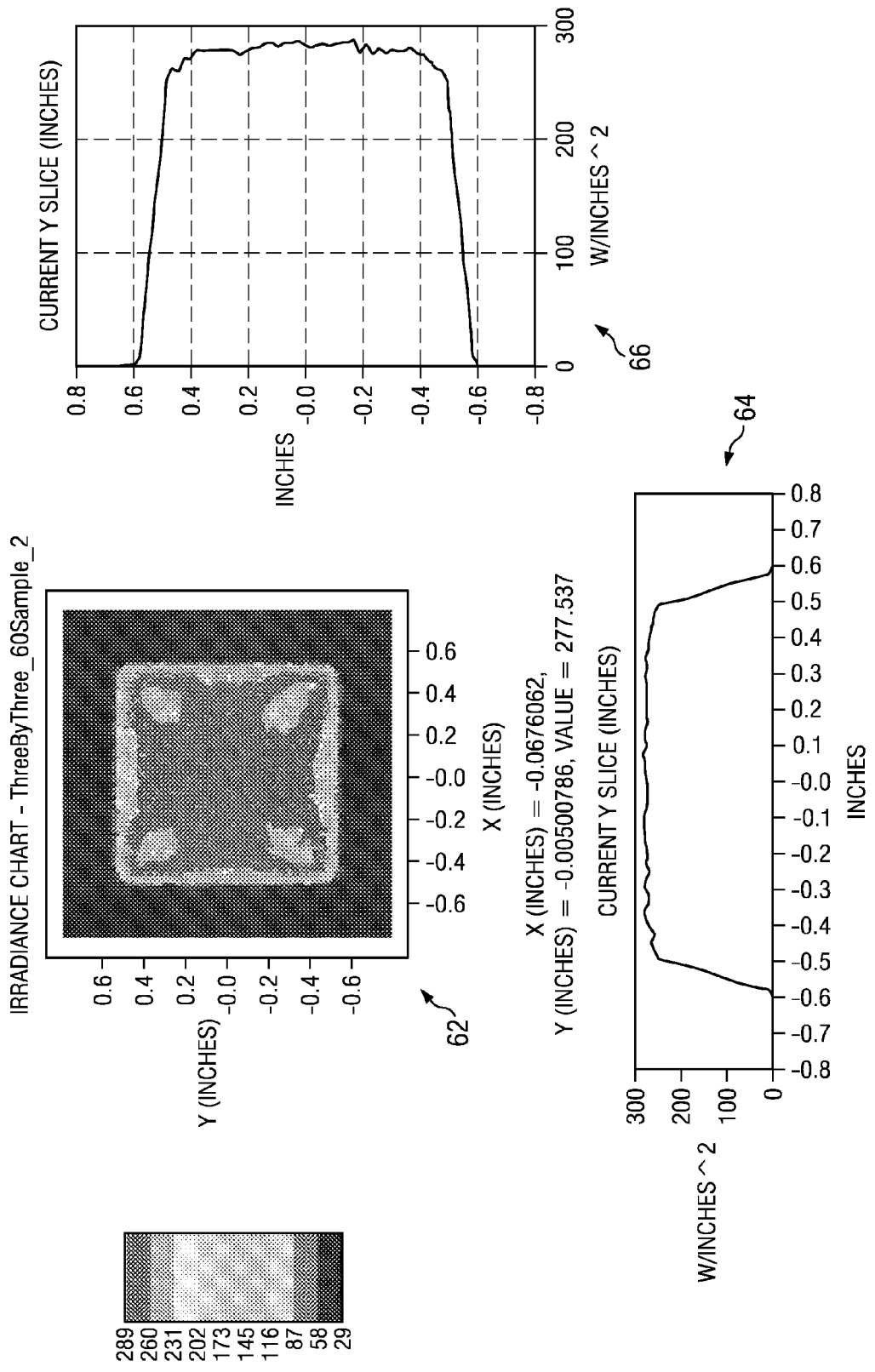
FIG. 12 is a chart illustrating analytical results of a spatial distribution for light generated by the optical source assembly/solar simulator of FIG. 1 after the light passes through the homogenizer.

FIGS. 11 and 12 illustrate the spectral light mixing that takes place in the homogenizer 48. The chart 56 in the center of FIG. 11 illustrates the spectral content of the light input to the homogenizer 48. The light is broken up into six matched pairs of colored light according to the properties of the spectral filter assembly 30. The graph 58 below the chart 56 shows the power per unit area of a horizontal cross-section of the input beam taken through y≈0.93 inches. The graph 60 to the right of the chart 56 shows the power per unit area of a vertical cross-section of the input beam taken through x≈0.97 inches. Each graph shows greater power per unit area to one side of the center, illustrating the spectral asymmetry in the output beam of filter assembly 30 in both the horizontal and vertical directions.

FIG. 12 illustrates the power distribution of the homogenizer output beam 55. The chart 62 in the upper left of FIG. 12 illustrates that the light is well mixed, as shown by the substantially uniform distribution of grays across the chart 62 in all directions. The graph 64 below the chart 62 shows the power per unit area of a horizontal cross-section of the output beam 55 taken through y≈−0.005 inches. The graph 66 to the right of the chart 62 shows the power per unit area of a vertical cross-section of the output beam 55 taken through x≈−0.068 inches. Each graph 64, 66 shows a balance in power per unit area to either side of the center, illustrating the spatial irradiance symmetry in the output beam 55 in both the horizontal and vertical directions.

The homogenized output beam 55 includes a range of angles determined by the geometry of the light source 22, the collector 24 and the homogenizer 48. In some embodiments the range of angles may be the same as that of the filtered light exiting the cone assembly 36. In other embodiments, however, including those in which the homogenizer 48 tapers outward from its first end 50 to its second end 52, the range of angles within the beam 55 may be less than that of the filtered light exiting the cone assembly 36. For example, the beam 55 exiting the homogenizer 48 may include a range of angles from zero to approximately four degrees. Those of ordinary skill in the art will appreciate that this range is only one example, and not limiting.

Figure 13:
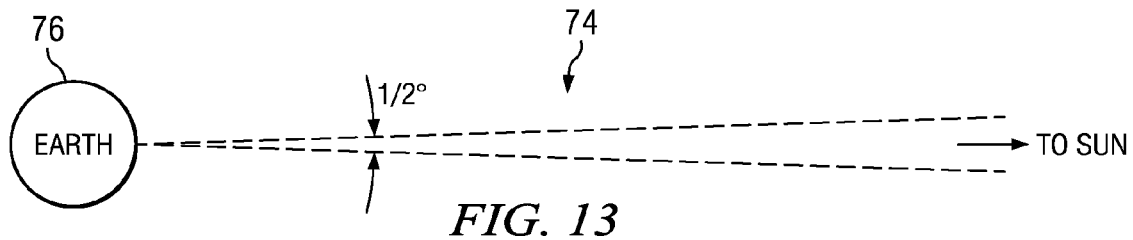
FIG. 13 is a side elevation view of solar rays striking Earth.

As shown in FIG. 13, sunlight 74 striking Earth's surface 76 has a cone angle of approximately one-half of one degree. This quantity is equivalent to a range of angles of from zero to one-quarter of one degree (¼°). This quantity is equivalent to a range of angles of from zero to one-quarter of one degree (0 to ±¼°. Thus, to closely simulate sunlight, the present optical source assembly/solar simulator 20 includes a lens assembly 78 (FIGS. 1, 2 and 17) that images and sizes the output of the homogenizer 48. In one embodiment, the resultant image at plane 21 has a range of beam angles from 0 to 0.26 degrees from the surface normal, which mimics the range of angles present in sunlight striking Earth's surface. Note that since the range of angles at the distal end of the homogenizer is larger than the range of angles at plane 21, the image was magnified by the ratio of the two sizes. Per the LaGrange invariant:

$$I_{21}A_{21} = I_{homogenizer}A_{homogenizer}$$

where $I_{21}$=image size at plane 21
$A_{21}$=angle size at plane 21
$I_{homogenizer}$=image size at homogenizer exit
$A_{homogenizer}$=angle size at homogenizer exit As a result, the power density at plane 21 is reduced by the square of the magnification. The imaging provided by the lens assembly 78 maintains the spatial and spectral characteristics of the beam.

With reference to FIGS. 1 and 2, the lens assembly 78 may include one or more lenses, and a doublet consisting of lenses 80 and 82 is one possible configuration. The lenses 80, 82 are spaced from the homogenizer 48 an appropriate distance to enable them to form an image. The spacing between the homogenizer 48 and the first lens 80, the spacing between the lenses 80, 82 (there may be more than two), and the optical characteristics of the lenses 80, 82 (focal lengths, refractive indices, radii of curvature, thickness, etc.) are all tailored to produce a desired beam image at a point in space distal of the lens assembly 78. For example, to simulate sunlight the range of angles of incidence in the test plane 21 should range from zero to one-quarter of one degree.

Figure 14:
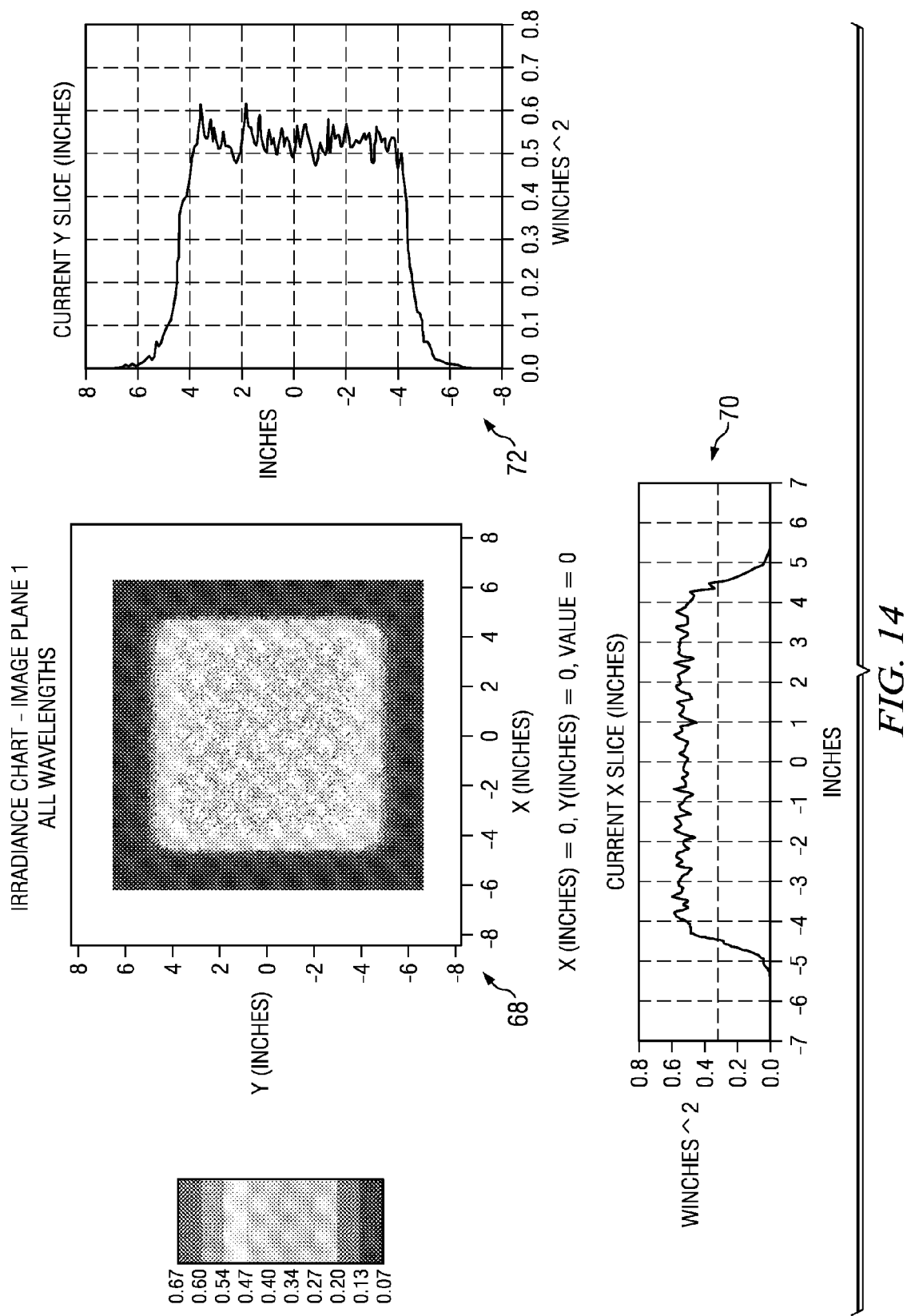
FIG. 14 is a chart illustrating analytical results of a spatial distribution for light generated by the optical source assembly/solar simulator of FIG. 1 after the light passes through the imaging lens assembly.

The chart 68 in the center of FIG. 14, which is a chart illustrating analytical results of a spatial distribution for light generated by the optical source assembly/solar simulator of FIG. 1 after the light passes through the lens assembly, illustrates the power distribution of the light after it has passed through the lens assembly 78. The light is well mixed, as illustrated by the substantially uniform distribution of power across the chart 68 in all directions. The graph 70 below the chart 68 shows the power per unit area of a horizontal cross-section of the light taken through y=0 inches. The graph 72 to the right of the chart 68 shows the power per unit area of a vertical cross-section of the v taken through x=0 inches. Each graph 70, 72 shows a balance in power per unit area to either side of the center, illustrating the spatial irradiance symmetry in the light in both the horizontal and vertical directions.

Figure 15:
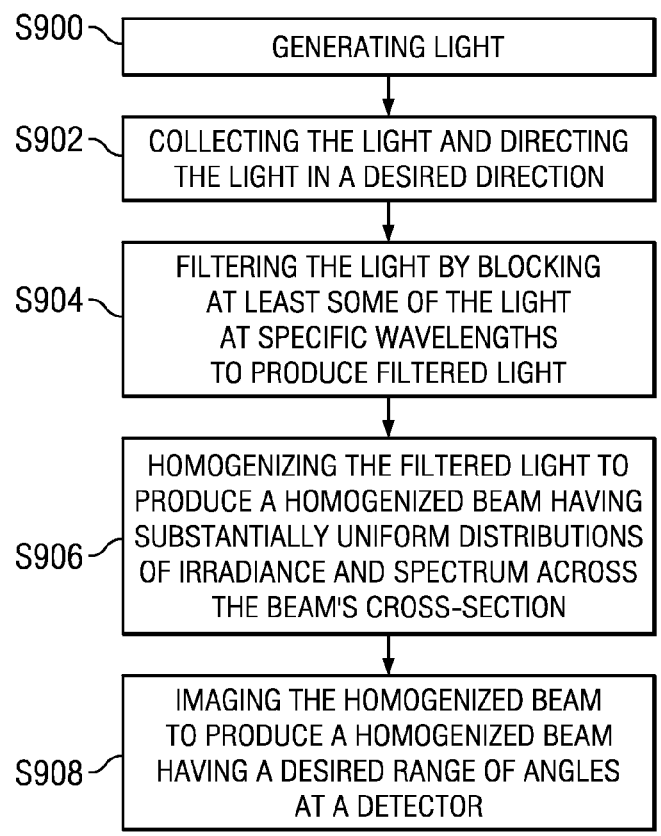
FIG. 15 is a flowchart illustrating steps in one embodiment of the present methods for simulating sunlight.

FIG. 15 illustrates one embodiment of a method for using the present source assembly/solar simulator 20 to test an optical sensor, such as a solar cell 21. The method includes the steps of generating light S900 and collecting the light and directing the light in a desired direction S902. In step S904 the light is filtered by blocking at least some of the light at specific wavelengths to produce filtered light. In step S906 the filtered light is homogenized to produce a homogenized beam having a substantially uniform distribution of irradiance and spectrum across the beam's cross-section. In step S908 the homogenized beam is imaged to produce a homogenized beam having a desired range of angles at a detector.

Figure 16:
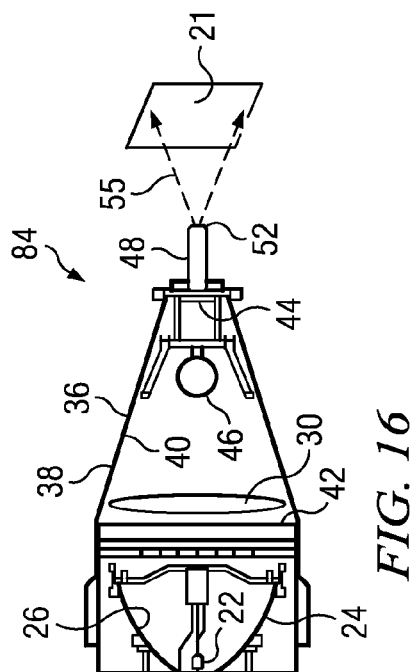
FIG. 16 is a side elevation view of an optical source assembly/solar simulator according to a further illustrative embodiment.

FIG. 16 illustrates another embodiment of the present optical source assembly/solar simulator 84. The optical source assembly/solar simulator 84 is similar to the optical source assembly/solar simulator 20 shown in FIGS. 1 and 2, and includes many of the same components as indicated by the common reference numerals. The optical source assembly/ solar simulator 84 of FIG. 16, however, does not include a lens assembly for imaging and sizing the homogenizer output beam 55. The solar cell/optical sensor 21 being tested is also located closer to the second end 52 of the homogenizer 48. The embodiment 84 of FIG. 16 shares many of advantageous features with the embodiment 20 of FIG. 1. The homogenizer output beam 55 is substantially uniform in irradiance and spectrum, and has a very high light concentration. The embodiment 84 of FIG. 16 is thus useful for testing the individual cells. In the embodiment illustrated in FIG. 16, device 21 has been moved away from second end 52 of the homogenizer 48 for illustrative purposes. In practice, the device 21 being tested will actually be located very close to the second end 52 of the homogenizer, where the light concentration may be over 1000 times the intensity of the sun.

Figure 17:
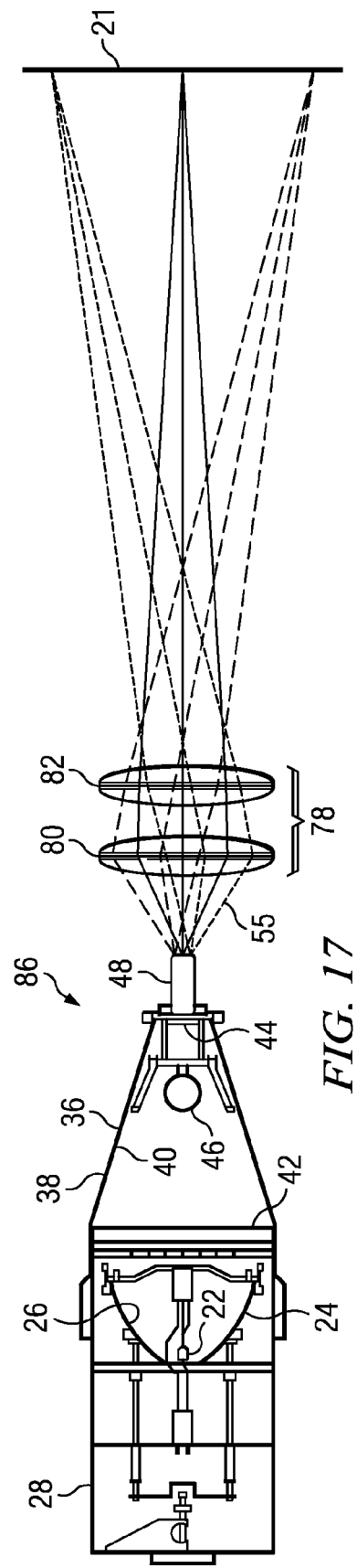
FIG. 17 is a side elevation view of an optical source assembly/solar simulator and imaging lens assembly according to a further illustrative embodiment.

FIG. 17 illustrates another embodiment of the present optical source assembly/solar simulator 86. The optical source assembly/solar simulator 86 is similar to the optical source assembly/solar simulator 20 shown in FIGS. 1 and 2, and includes many of the same components as indicated by the common reference numerals. The optical source assembly/ solar simulator 86 of FIG. 17, however, does not include a spectral filter assembly. The embodiment 86 of FIG. 17 is thus configured to shape and image light without spectral filtering.

The present source assembly/solar simulator 20, 84, 86 advantageously produces an output beam at a point in space that is well mixed spatially, spectrally balanced, and imaged to have a small range of angles. Solar cells or other optical sensors 21 can be placed at the image plane to be tested (FIG. 1). The irradiance level at this plane can be from a fraction of a Sun to multiple Suns, depending on the area illuminated, the filtering technique used and the size of lamp 22 used. By adjusting the filter elements 32, the user can adjust the content of each individual wavelength contribution while still maintaining the spatial and spectral balance across the test area. The spectral bands into which the light is broken up are determined by the design of the filter elements 32. The adjustability can be from 100% to 0% for any particular wavelength band. The optical source assembly/solar simulator 20 and 84 can be quickly and easily adjusted to virtually any integrated spectral distribution. They can be quickly and easily adjusted to starve one particular layer in a multi-junction solar cell of light in order to investigate that specific layer's performance and characteristics. With the proper optical diagnostics, optical source assembly/solar simulator 20 and 84 can continually adjust the spectral levels and distribution to maintain the system within specifications automatically. This adjustability can advantageously correct for changes in spectral output due to such things as lamp age and thermal issues, which presently plague source assembly/solar simulators in testing environments.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus, comprising:
a light source configured to generate light;
a reflector configured to collect the light and direct the light in a desired direction;
a spectral filter assembly configured to receive the light from the reflector, the spectral filter assembly comprising:
a stationary frame, wherein the stationary frame defines a plurality of wedge-shaped apertures; and
a plurality of filter elements supported by the stationary frame, each filter element of the plurality of filter elements simultaneously filtering a desired quantity of light within a wavelength band to provide a filtered output light beam, wherein the plurality of filter ele- ments each comprises a wedge-shaped filter element mounted in a wedge-shaped aperture of the stationary frame; and a homogenizer configured to receive the filtered output light beam and produce a homogenized light beam, the homogenized light beam having a substantially uniform irradiance distribution across a cross-section of the homogenized light beam.

2. The apparatus of claim 1, further comprising a lens assembly configured to form an image of the homogenized light beam.

3. The apparatus of claim 2, wherein the lens assembly is further configured to size the image of the homogenized light beam.

4. The apparatus of claim 1, wherein each of the plurality of wedge-shaped filter elements are mounted in a wedge-shaped aperture of the stationary frame for independent movement between a fully inserted position in a path of the light from the reflector for filtering the light from the reflector, and a fully retracted position substantially outside the path of the light from the reflector.

5. An apparatus, comprising:
a light source configured to generate light;
a reflector configured to collect the light and direct the light in a desired direction;
a spectral filter assembly configured to receive the light from the reflector, the spectral filter assembly comprising:
a stationary frame; and
a plurality of filter elements supported by the stationary frame, wherein the plurality of filter elements comprises a plurality of pairs of diametrically opposed filter elements, filter elements of each diametrically opposed pair of the plurality of diametrically opposed pairs of filter elements simultaneously filtering a desired quantity of light within the same wavelength band to provide a filtered output light beam, wherein a spectral content of light within one portion of a cross-section of the filtered output light beam matches the spectral content of light within a diametrically opposed portion of the cross-section of the filtered output light beam, and wherein each filter element of the plurality of diametrically opposed pairs of filter elements is independently moveable between a fully inserted position in a path of the light from the reflector, and a fully retracted position substantially outside the path of the light from the reflector; and
a homogenizer configured to produce a homogenized light beam, the homogenized light beam having a substantially uniform irradiance distribution and a substantially uniform spectral distribution.

6. The apparatus of claim 5, wherein at least some filter elements of the plurality of diametrically opposed filter elements are in the fully inserted position, and at least some filter elements of the plurality of diametrically opposed filter elements are in the fully retracted position.

7. The apparatus of claim 5, wherein at least some filter elements of the plurality of diametrically opposed filter elements are in an intermediate position between the fully inserted position and the fully retracted position.

8. The apparatus of claim 5, wherein there is substantially no gap between a wavelength band of one diametrically opposed pair of filter elements of the plurality of pairs of diametrically opposed pairs of filter elements and a neighboring wavelength band of another diametrically opposed pair of filter elements of the plurality of pairs of diametrically opposed filter elements.

9. The apparatus of claim 5, wherein a wavelength band of one diametrically opposed pair of filter elements of the plurality of pairs of diametrically opposed pairs of filter elements overlaps a neighboring wavelength band of another diametrically opposed pair of filter elements of the plurality of pairs of diametrically opposed filter elements.

10. The apparatus of claim 5, wherein there is a gap between a wavelength band of one diametrically opposed pair of filter elements of the plurality of pairs of diametrically opposed pairs of filter elements and a neighboring wavelength band of another diametrically opposed pair of filter elements of the plurality of pairs of diametrically opposed filter elements.

11. The apparatus of claim 1, wherein the homogenizer comprises an elongate tubular member having reflective inner surfaces, and tapers along at least a portion of a length of the homogenizer from a smaller cross-sectional area to a larger cross-sectional area.

12. The apparatus of claim 1, wherein the homogenizer comprises an elongate tubular member having reflective inner surfaces and tapers along at least a portion of a length of the homogenizer from a larger cross-sectional area to a smaller cross-sectional area.

13. The apparatus of claim 1, further comprising a cone assembly located between the spectral filter assembly and the homogenizer, the cone assembly having absorptive inner surfaces, the cone assembly tapering downwardly from a first aperture proximate the spectral filter assembly to a second aperture spaced from the spectral filter assembly, the first aperture being larger than the second aperture, the absorptive inner surfaces configured to capture and contain light rays not traveling in a desired direction.

14. The apparatus of claim 2, wherein the image of the homogenized light beam simulates sunlight.

15. A method comprising:
generating light;
collecting the light and directing the light in a desired direction;
simultaneously filtering the light by a plurality of filter elements to provide a filtered output light beam, wherein each filter element of the plurality of filter elements blocks a desired quantity of light within a wavelength band, and wherein each filter element of the plurality of filter elements is supported for independent movement between a fully inserted position in a path of the light for filtering the light, and a fully retracted position substantially outside the path of the light; and
homogenizing the filtered output light beam to produce a homogenized light beam having a substantially uniform irradiance distribution across a cross-section of the homogenized light beam.

16. The method of claim 15, further comprising the step of imaging the homogenized light beam to produce an image of the homogenized light beam having a desired range of angles at a detector.

17. The method of claim 15, wherein the plurality of filter elements comprises a plurality of pairs of diametrically opposed filter elements, wherein a spectral content of light within one portion of a cross-section of the filtered output light beam matches the spectral content of light within a diametrically opposed portion of the cross-section of the filtered output light beam, and wherein the homogenized light beam has a substantially uniform spectral distribution across the cross-section of the homogenized light beam.

18. The method of claim 17, wherein at least some filter elements of the plurality of diametrically opposed filter elements are in the fully inserted position, and at least some filter elements of the plurality of diametrically opposed filter elements are in the fully retracted position.

19. The method of claim 17, wherein at least some filter elements of the plurality of diametrically opposed filter elements are in an intermediate position between the fully inserted position and the fully retracted position.

20. The method of claim 16, wherein the image of the homogenized light beam simulates sunlight.

21. The apparatus of claim 5, wherein the substantially uniform spectral distribution is across a cross-section of the homogenized light beam.

\* \* \* \* \*